(12) United States Patent
Yoshida et al.

(10) Patent No.: US 10,147,931 B2
(45) Date of Patent: Dec. 4, 2018

(54) PRISMATIC SECONDARY BATTERY

(71) Applicant: Sanyo Electric Co., Ltd., Daito-shi, Osaka (JP)

(72) Inventors: Shinichirou Yoshida, Hyogo (JP); Tomokazu Yamanaka, Hyogo (JP); Hiroyuki Inoue, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/666,713

(22) Filed: Aug. 2, 2017

(65) Prior Publication Data

US 2018/0062152 A1    Mar. 1, 2018

(30) Foreign Application Priority Data

Aug. 31, 2016  (JP) ................. 2016-168813

(51) Int. Cl.
*H01M 2/34* (2006.01)
*H01M 10/0587* (2010.01)

(52) U.S. Cl.
CPC ....... *H01M 2/348* (2013.01); *H01M 10/0587* (2013.01); *H01M 2200/103* (2013.01)

(58) Field of Classification Search
CPC ............. H01M 2/348; H01M 10/0587; H01M 2200/103
See application file for complete search history.

(56) References Cited

U.S. PATENT DOCUMENTS

| | | | |
|---|---|---|---|
| 2011/0244281 A1 | 10/2011 | Byun | |
| 2013/0084471 A1 | 4/2013 | Han et al. | |
| 2013/0136960 A1 | 5/2013 | Guen | |
| 2013/0196186 A1 | 8/2013 | Yokoyama et al. | |
| 2016/0293928 A1* | 10/2016 | Wakimoto | H01M 2/263 |
| 2016/0380303 A1* | 12/2016 | Minami | H01M 4/485 |
| | | | 429/61 |

FOREIGN PATENT DOCUMENTS

JP    2016-103412 A    6/2016

* cited by examiner

*Primary Examiner* — Stewart A Fraser
(74) *Attorney, Agent, or Firm* — Westerman, Hattori, Daniels & Adrian, LLP (57) ABSTRACT

A prismatic secondary battery includes an electrode assembly, a casing having an opening, a sealing plate sealing the opening, a terminal connected to an electrode that constitutes the electrode assembly, and a current collector connected to the electrode. The current collector has a base portion located along the sealing plate and a lead portion extending from an end portion of the base portion toward a bottom of the casing. The base portion is welded to the terminal. The lead portion is connected to a substrate exposure portion of the electrode and has a fusible portion that is fusible by an excessive current and that has a smallest cross section compared to the remaining portion. The fusible portion has a cross section equal to or smaller than 92% of a cross section of the base portion that passes through an end portion of a weld-connection portion closer to the lead portion.

9 Claims, 8 Drawing Sheets

PRISMATIC SECONDARY BATTERY

CROSS REFERENCE TO RELATED APPLICATIONS

The present invention application claims priority to Japanese Patent Application No. 2016-168813 filed in the Japan Patent Office on Aug. 31, 2016, the entire contents of which are incorporated herein by reference.

BACKGROUND OF THE INVENTION

Field of the Invention

The present invention relates to a prismatic secondary battery including current collectors connected to a positive electrode and a negative electrode that constitute an electrode assembly.

Description of Related Art

Some prismatic secondary batteries are formed such that a flat electrode assembly including a positive electrode and a negative electrode is housed in a prismatic casing and the positive electrode and the negative electrode are electrically connected to a positive terminal and a negative terminal provided on a sealing plate via current collectors respectively (for example, see Japanese Published Unexamined Patent Application No. 2016-103412 (Patent Document 1)).

Secondary batteries having a protection function for, in a case where an excessive current flows through the secondary batteries due to an external short-circuit, blocking the current path are known.

However, in a case of a secondary battery not having such a protection function or in a case of a secondary battery having such a protection function, which, however, is not activated, when an excessive current flows through the secondary battery, a portion of the current collector that is a current path of the excessive current may be blown. If the current collector is blown in a location close to the electrode assembly, the current collector and the electrode assembly may come into contact with each other in the blowout location. In this case, the connection state of the current path within the secondary battery becomes unstable. Further, in the blowout location, a spark may be produced between the current collector and the electrode assembly. In this case, the battery case and so on may be damaged or broken.

Further, even in a case where a cutout is provided on the boundary between a base portion and a lead portion of the current collector, the current collector is not necessarily blown around the cutout. In the case where an excessive current is provided, the electrode assembly becomes a large heat generation source, and therefore, the current collector is highly likely to be blown in a portion close to the electrode assembly.

BRIEF SUMMARY OF THE INVENTION

The present invention is made in view of the above-described issues, and an object thereof is to provide a highly reliable prismatic secondary battery that allows the current collector to be blown in a portion apart from the electrode assembly with certainty in a case where an excessive current flows through the secondary battery.

A prismatic secondary battery according to an aspect of the present invention includes: a casing that has an opening; an electrode assembly that is housed in the casing and includes a positive electrode and a negative electrode; a sealing plate that seals the opening and has a through-hole; a terminal that is electrically connected to the positive electrode or to the negative electrode and passes through the through-hole; and a current collector that is electrically connected to the positive electrode or to the negative electrode and has a base portion that is located between the sealing plate and the electrode assembly along the sealing plate, has an aperture, and is weld-connected to the terminal in a vicinity of the aperture, and a lead portion that extends from an end portion of the base portion in a direction toward a bottom of the casing, is connected to a substrate exposure portion of the positive electrode or the negative electrode, and has a fusible portion that is fusible by an excessive current, the fusible portion being located closer to the sealing plate than an end portion, of the electrode assembly, closer to the sealing plate and having a smallest cross section compared to a remaining portion of the lead portion. The fusible portion has a cross section that is equal to or smaller than 92% of a cross section of the base portion that passes through an end portion of a weld-connection portion, for connection between the base portion and the terminal, closer to the lead portion in a longitudinal direction of the sealing plate and that is orthogonal to the longitudinal direction of the sealing plate.

According to an aspect of the present invention, it is possible to provide a highly reliable prismatic secondary battery that allows the current collector to be blown in a portion apart from the electrode assembly with certainty in a case where an excessive current flows through the secondary battery.

BRIEF DESCRIPTION OF THE SEVERAL VIEWS OF THE DRAWINGS

FIGS. 1A and 1B are views schematically illustrating the structure of a prismatic secondary battery according to an embodiment of the present invention, where

FIGS. 2A and 2B are views schematically illustrating the structure of a positive electrode current collector according to an embodiment of the present invention, where

DETAILED DESCRIPTION OF THE INVENTION

Hereinafter, embodiments of the present invention will be described in detail with reference to the drawings. Note that the present invention is not limited to embodiments described below. Further, modifications can be made as appropriate without departing from the scope within which the present invention exerts effects.

Figure 1A:
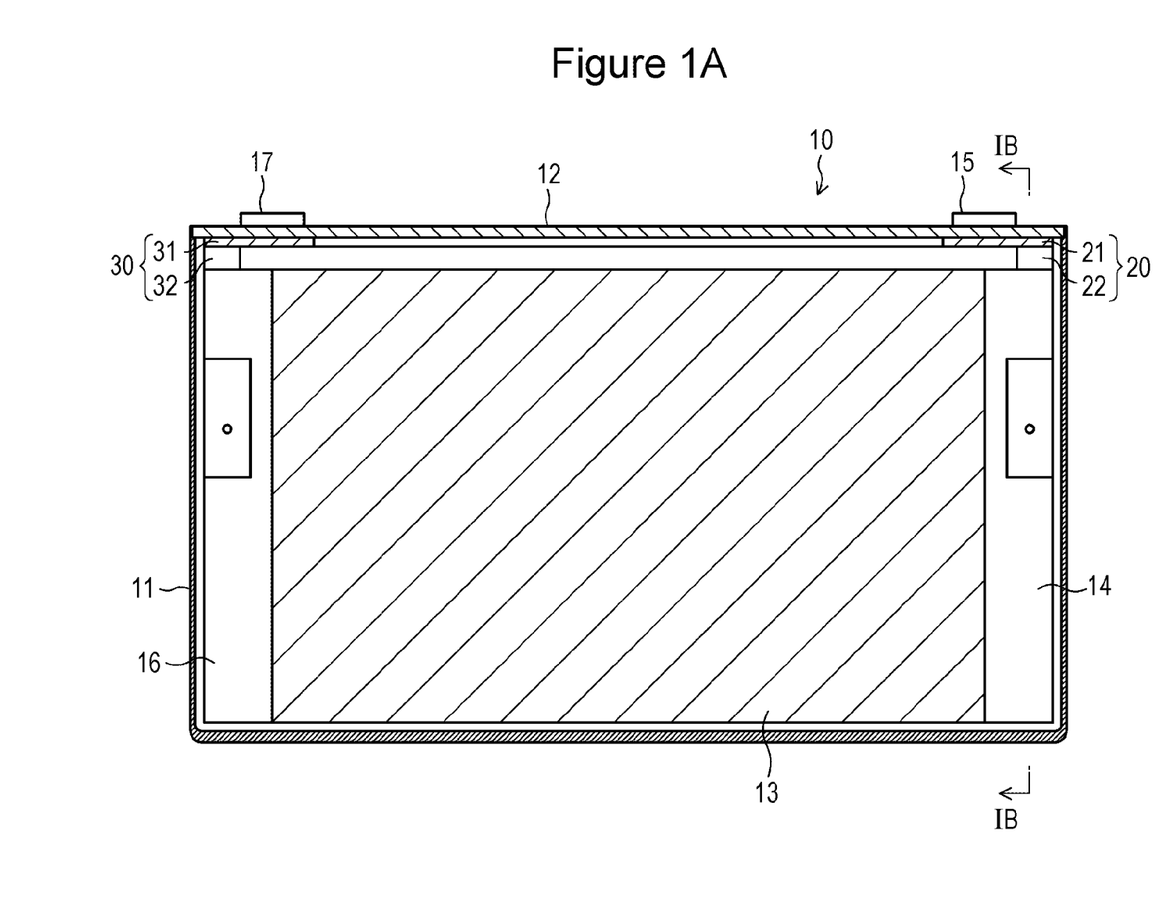
FIG. 1A is a cross-sectional view and FIG. 1B is a cross-sectional view taken along line IB-IB of FIG. 1A.
Figure 1B:
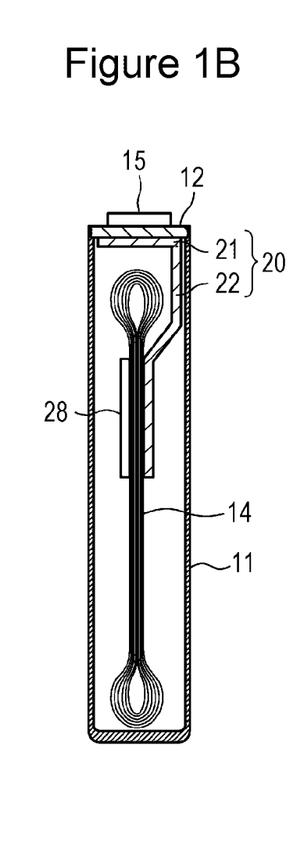

FIGS. 1A and 1B are views schematically illustrating the structure of a prismatic secondary battery according to an embodiment of the present invention, where FIG. 1A is a cross-sectional view and FIG. 1B is a cross-sectional view taken along line IB-IB of FIG. 1A.

As illustrated in FIGS. 1A and 1B, in a prismatic secondary battery 10 according to the present embodiment, an electrode assembly 13, which is a power generating element, is housed in a casing 11 together with an electrolyte solution. The casing 11 has an opening that is sealed by a sealing plate 12. A positive terminal 15 and a negative terminal 17 respectively pass through through-holes provided in the sealing plate 12 and are fixed to the sealing plate 12. Here, the electrode assembly 13 has a structure in which a positive electrode and a negative electrode (not illustrated) are wounded together or stacked with a separator (not illustrated) interposed therebetween. As the positive electrode, a positive electrode that is constituted by a positive electrode substrate and a positive electrode active material layer containing a positive electrode active material and provided on the surface of the positive electrode substrate can be used. As the negative electrode, a negative electrode that is constituted by a negative electrode substrate and a negative electrode active material layer containing a negative electrode active material and provided on the surface of the negative electrode substrate can be used. Note that the positive terminal 15 and the negative terminal 17 are fixed to the sealing plate 12 via insulation members (not illustrated) respectively provided on the upper surface and the lower surface of the sealing plate 12. Although not illustrated in FIGS. 1A and 1B, an insulation sheet that is bent in a box form is disposed between the electrode assembly 13 and the casing 11.

The positive electrode has a positive electrode substrate exposure portion 14, on which the active material layer is not formed, on one side portion thereof, and the negative electrode has a negative electrode substrate exposure portion 16, on which the active material layer is not formed, on one side portion thereof. The positive electrode and the negative electrode are disposed such that the positive electrode substrate exposure portion 14 and the negative electrode substrate exposure portion 16 respectively extend in directions opposite to each other (the right and left directions in FIG. 1A). The positive electrode substrate exposure portion 14 is connected to the positive terminal 15 via a positive electrode current collector 20. The negative electrode substrate exposure portion 16 is connected to the negative terminal 17 via a negative electrode current collector 30.

The positive electrode current collector 20 has a base portion 21, which is located between the sealing plate 12 and the electrode assembly 13 along the sealing plate 12, and a lead portion 22, which extends from an end portion of the base portion 21 in a direction toward the bottom of the casing 11 and is bent in the middle thereof. Similarly, the negative electrode current collector 30 has a base portion 31, which is located between the sealing plate 12 and the electrode assembly 13 along the sealing plate 12, and a lead portion 32, which extends from an end portion of the base portion 31 in a direction toward the bottom of the casing 11 and is bent in the middle thereof. The base portion 21 is weld-connected to the positive terminal 15 in the vicinity of an aperture (not illustrated) provided in the base portion 21, and the base portion 31 is weld-connected to the negative terminal 17 in the vicinity of an aperture (not illustrated) provided in the base portion 31. The lead portion 22 and the lead portion 32 are respectively weld-connected to the positive electrode substrate exposure portion 14 and to the negative electrode substrate exposure portion 16.

Note that, in a case where the secondary battery 10 is a non-aqueous electrolyte secondary battery, it is preferable that the positive electrode substrate, the positive electrode current collector 20, and the positive terminal 15 be made of aluminum or an aluminum alloy. Further, it is preferable that the negative electrode substrate, the negative electrode current collector 30, and the negative terminal 17 be made of copper or a copper alloy.

It is preferable that the casing 11 and the sealing plate 12 be made of metal, such as aluminum, an aluminum alloy, stainless steel, or iron.

Although not illustrated in FIG. 1A, it is preferable that the sealing plate 12 be provided with a gas release vent that ruptures when the pressure within the casing 11 is equal to or higher than a predetermined value to release gas within the casing 11 outside the casing 11. Further, it is preferable that the sealing plate 12 be provided with an electrolytic solution inlet for pouring an electrolytic solution into the casing 11.

Figure 4:
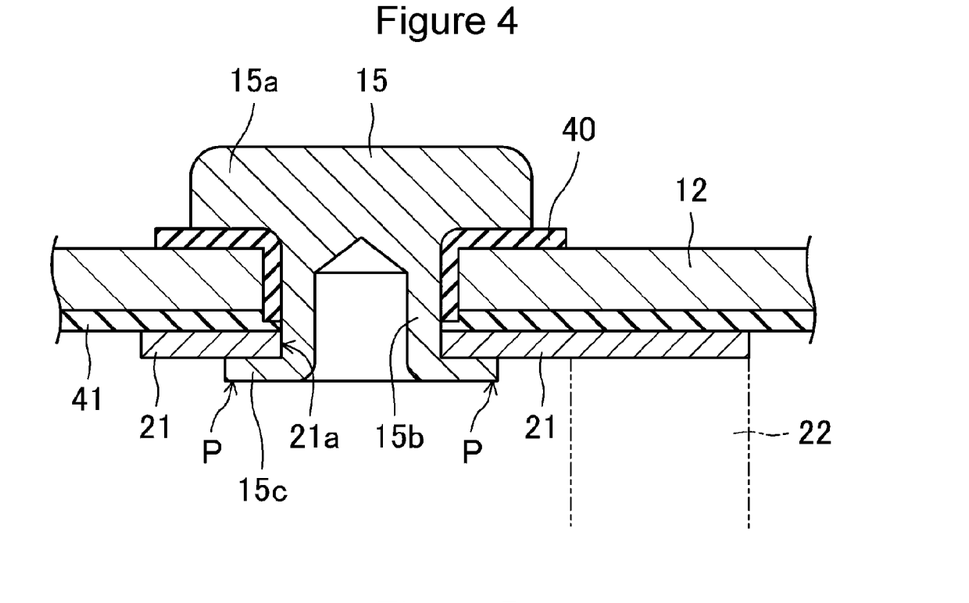
FIG. 4 is an enlarged partial cross-sectional view of the vicinity of a positive terminal of the second battery illustrated in FIGS. 1A and 1B.

As illustrated in FIG. 4, the positive terminal 15 has a flange portion 15a, which is located on the sealing plate 12 with an insulation member 40 interposed therebetween. It is preferable that the insulation member 40 be made of resin. Further, the positive terminal 15 has a cylindrical portion 15b, which is inserted into and passes through an aperture 21a formed in the base portion 21 of the positive electrode current collector 20 and has a leading end portion 15c having an increased diameter so as to fix the positive terminal 15 and the positive electrode current collector 20 to the sealing plate 12 via an insulation member 41.

Figure 2A:
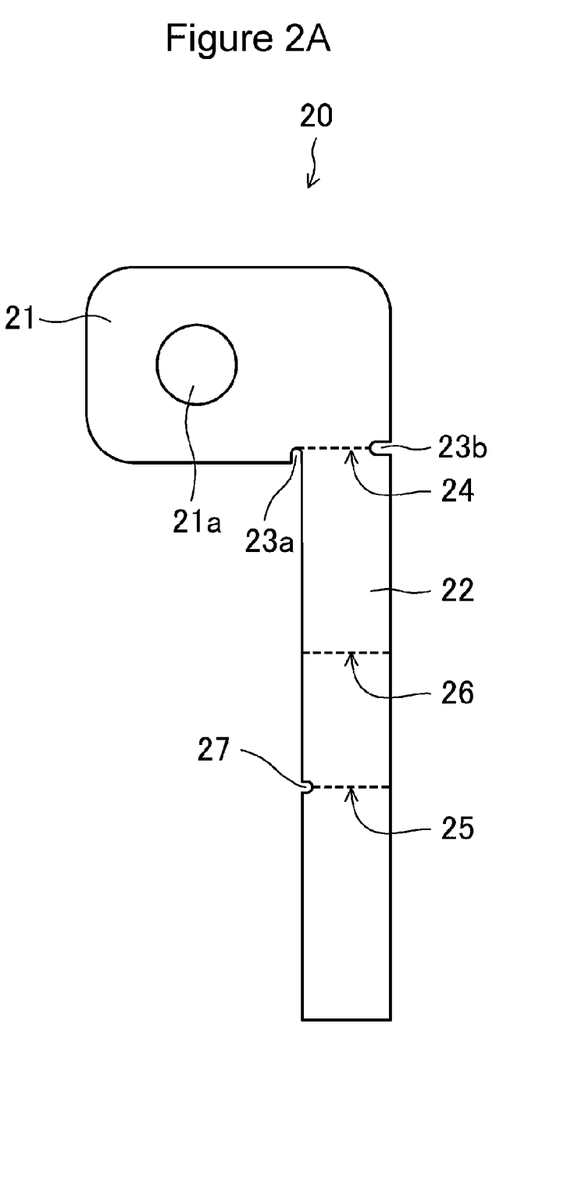
FIG. 2A is a plan view of the positive electrode current collector that is not bent.
Figure 2B:
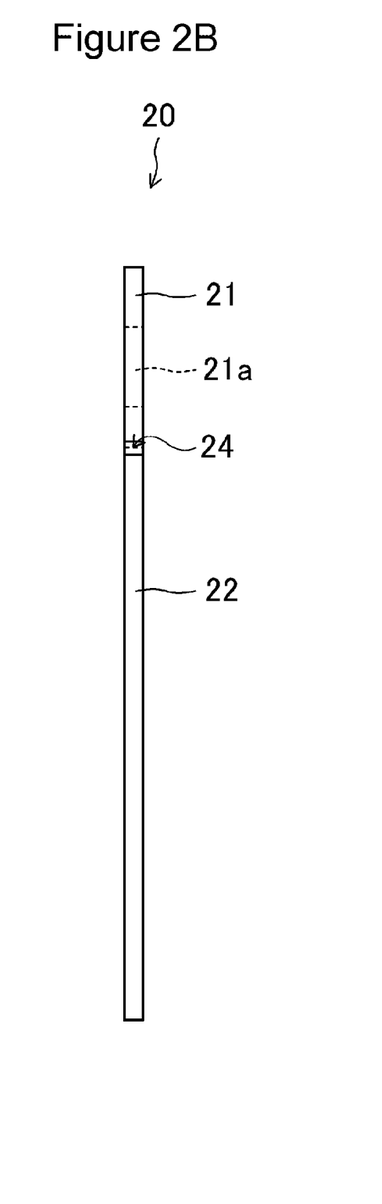
FIG. 2B is a side view of the positive electrode current collector that is not bent.
Figure 3:
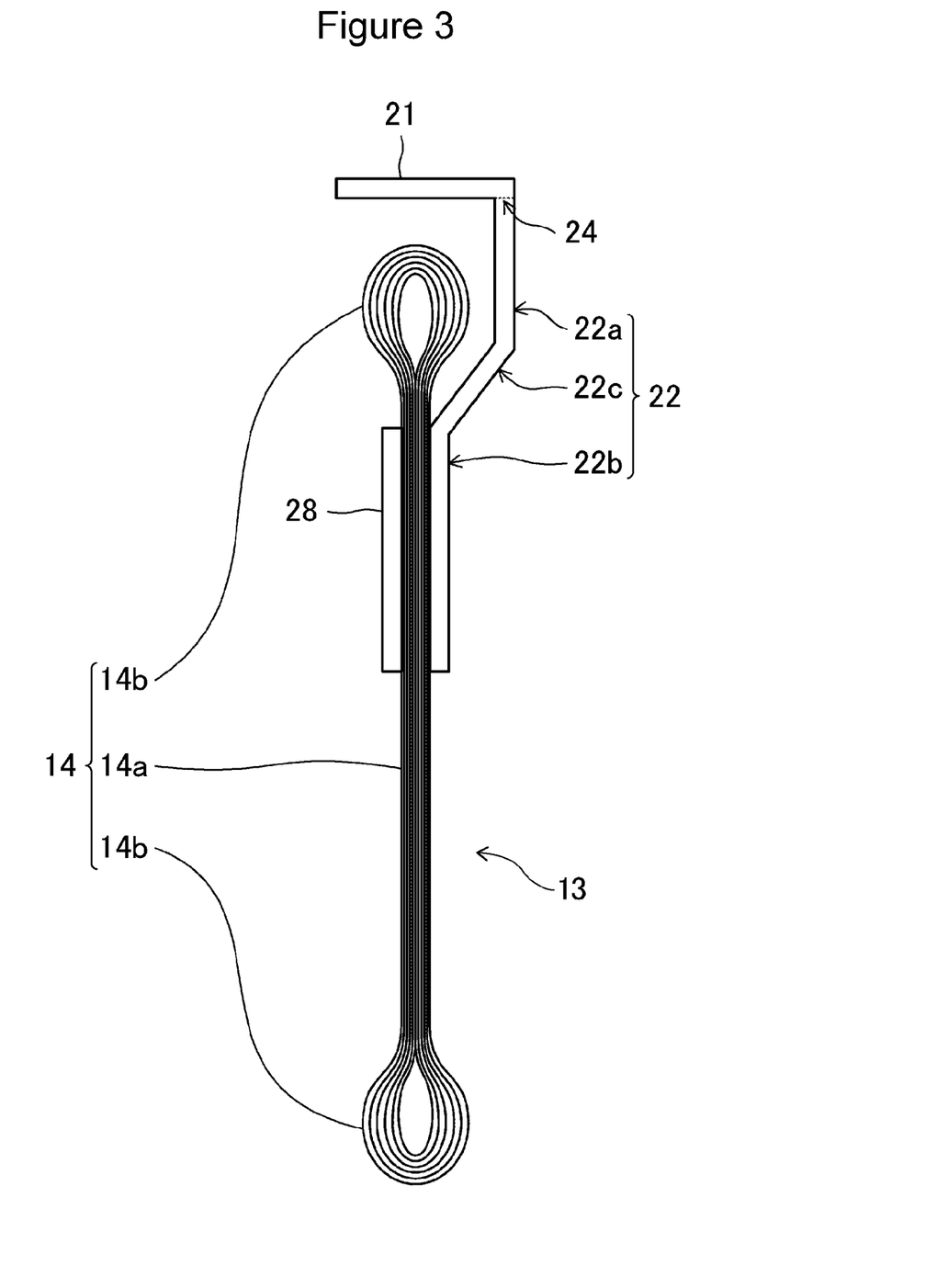
FIG. 3 is a side view of the positive electrode current collector that is bent and welded to a positive electrode substrate exposure portion.

FIGS. 2A and 2B are views schematically illustrating the structure of the positive electrode current collector 20 according to the present embodiment, where FIG. 2A is a plan view of the positive electrode current collector 20 that is not bent, and FIG. 2B is a side view of the positive electrode current collector 20 that is not bent. FIG. 3 is a side view of the positive electrode current collector 20 that is bent and welded to the positive electrode substrate exposure portion 14. Note that, in FIG. 3, the casing 11, the sealing plate 12, and the positive terminal 15 illustrated in FIG. 1B are omitted. The lead portion 22 can be provided with a rib in an end portion of the lead portion 22 in the width direction in an area in which the lead portion 22 is welded to the positive electrode substrate exposure portion 14. By providing such a rib, an effect can be produced, that is, it is possible to suppress flying of melting metal upon welding the lead portion 22 to the positive electrode substrate exposure portion 14. Further, the rib can be provided as a radiation fin.

As illustrated in FIGS. 2A and 2B, the positive electrode current collector 20 has the base portion 21 and the lead portion 22, and the aperture 21a through which a portion of the positive terminal 15 passes is formed in the base portion 21. On the boundary between the base portion 21 and the lead portion 22, cutouts 23a and 23b are formed, and the lead portion 22 is bent along the dashed line 24 that connects the cutouts 23a and 23b with each other. In the middle of the lead portion 22, a second cutout 27 is formed, and a portion of the lead portion 22 is bent along the dashed line 25 that passes through the second cutout 27. The lead portion 22 is further bent along the dashed line 26.

FIG. 3 is a side view of the positive electrode current collector 20 that is bent and welded to the positive electrode substrate exposure portion 14. Note that, in FIG. 3, the casing 11, the sealing plate 12, and the positive terminal 15 illustrated in FIG. 1B are omitted.

The electrode assembly 13 illustrated in FIG. 3 is a wounded electrode assembly formed by winding the positive electrode and the negative electrode together, and the wounded electrode assembly is housed in the casing 11 such that the winding axis is oriented parallel to the sealing plate 12. The positive electrode substrate exposure portion 14 has an area 14a, in which the positive electrode and the negative electrode are tied together and which has a small thickness, and areas 14b, which are located on the respective sides of the area 14a having a small thickness and which have a large thickness.

As illustrated in FIG. 3, the lead portion 22 has a first area 22a, which is bent along the dashed line 24 and extends from the base portion 21 toward the bottom of the casing 11, a second area 22b, which is bent along the dashed line 25, is located closer to the center of the casing 11 than the first area 22a, and is connected to the area 14a, having a small thickness, of the positive electrode substrate exposure portion 14, and a third area 22c, which connects the first area 22a with the second area 22b.

As illustrated in FIG. 3, the area 14a, having a small thickness, of the positive electrode substrate exposure portion 14 is sandwiched between the second area 22b of the lead portion 22 and a current collector holder 28 on the sides thereof, and the positive electrode substrate exposure portion 14 is welded to the second area 22b of the lead portion 22 and to the current collector holder 28. The welding is performed by, for example, bringing electrode rods into contact with the second area 22b of the lead portion 22 and the current collector holder 28 respectively and providing a current between the electrode rods. The method for connecting the lead portion 22 with the positive electrode substrate exposure portion 14 is not limited to resistance welding and may be ultrasonic welding or laser welding, for example. Further, the current collector holder 28 need not be used. It is preferable that the distance between the boundary between the base portion 21 and the lead portion 22 and the boundary between the second area 22b and the third area 22c of the lead portion 22 be within a range from 10 mm to 25 mm.

In the connection structure of the lead portion 22 and the positive electrode substrate exposure portion 14 illustrated in FIG. 3, in a case where the lead portion 22 is blown at a position of the third area 22c of the lead portion 22, for example, the electrode assembly 13 may move toward the bottom of the casing 11, and one of the areas 14b, having a large thickness, of the positive electrode substrate exposure portion 14 may come into contact with the blown portion of the third area 22c of the lead portion 22.

FIG. 4 is an enlarged partial cross-sectional view of the vicinity of the positive terminal 15 of the second battery illustrated in FIGS. 1A and 1B.

As illustrated in FIG. 4, the flange portion 15a of the positive terminal 15 is located on the sealing plate 12 with the insulation member 40 interposed therebetween. It is preferable that the insulation member 40 be made of resin. Further, the cylindrical portion 15b of the positive terminal 15 is inserted into and passes through the aperture 21a formed in the base portion 21 of the positive electrode current collector 20, and the leading end portion 15c has an increased diameter so as to fix the positive terminal 15 and the positive electrode current collector 20 to the sealing plate 12 via the insulation member 41. It is preferable that the insulation member 41 be made of resin. The leading end portion 15c of the positive terminal 15 is welded to the base portion 21 of the positive electrode current collector 20 in a location indicated by the arrows P in FIG. 4.

Figure 5:
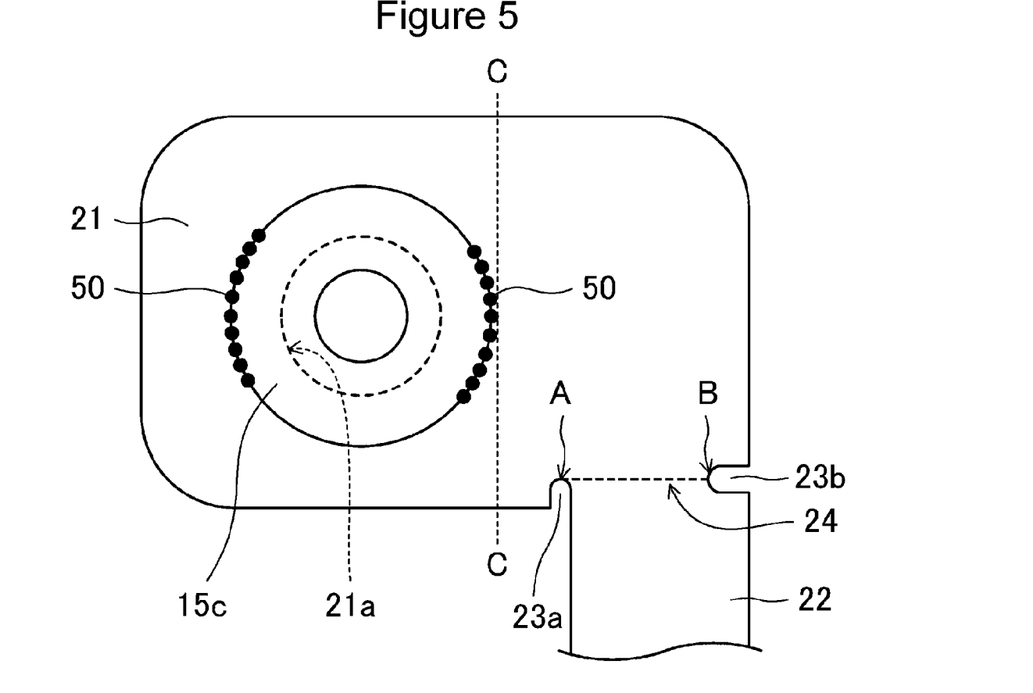
FIG. 5 is a plan view of the positive electrode current collector in which a leading end portion of the positive terminal is welded to a base portion of the positive electrode current collector, as viewed from inside the battery.

FIG. 5 is a plan view of the positive electrode current collector 20 which is not bent and in which the leading end portion 15c of the positive terminal 15 is welded to the base portion 21 of the positive electrode current collector 20, as viewed from inside the battery.

As illustrated in FIG. 5, the base portion 21 is welded to the leading end portion 15c of the positive terminal 15 in the vicinity of the aperture 21a provided in the base portion 21. Here, in both end portions of the circumference edge of the aperture 21a in the longitudinal direction of the sealing plate 12, weld-connection portions 50 for connection between the base portion 21 and the positive terminal 15 are symmetrically formed. The base portion 21 can be welded to the positive terminal 15 by performing spot welding using a laser beam, for example, and the weld-connection portions 50 indicate welding traces (nuggets) formed by laser welding.

The lead portion 22 has a fusible portion 24, which is located on the boundary between the base portion 21 and the lead portion 22, which has the smallest cross section compared to the remaining portion of the lead portion 22, and which is fusible by an excessive current. Here, as illustrated in FIG. 5, the cutouts (first cutouts) 23a and 23b are formed on the boundary between the base portion 21 and the lead portion 22 on the respective end portions of the lead portion 22 in the width direction. The portion indicated by the dashed line that connects the vertex A of the cutout 23a with the vertex B of the cutout 23b forms the fusible portion 24.

In the present embodiment, the fusible portion 24 has the smallest cross section in the lead portion 22, and therefore, has the largest resistance compared to the remaining portion of the lead portion 22. Accordingly, in a case where an excessive current flows through the secondary battery, in the positive electrode current collector 20, which is a current path, the fusible portion 24 is a portion that generates the largest Joule heat due to a short-circuit current. As a consequence, in the case where an excessive current flows through the secondary battery, it is expected that the lead portion 22 is blown in the fusible portion 24.

However, it is found as a result of consideration by the present inventors that the lead portion 22 is not necessarily blown in the portion having the smallest cross section because of the following reason. In the case where an excessive current flows through the secondary battery, the electrode assembly 13, which is a power generating element, becomes a heat generation source. Accordingly, an increase in the temperature of a portion close to the electrode assembly 13 is the largest in the lead portion 22 of the positive electrode current collector 20, and the lead portion can be blown in the portion.

Accordingly, the present inventors conducted an external-short-circuit test in a state where the lead portion 22 of the positive electrode current collector 20 was connected to the positive electrode substrate exposure portion 14 and the base portion 21 was welded to the positive terminal 15, as illustrated in FIG. 3 and FIG. 5, and checked the occurrence of blowout in the fusible portion 24. The secondary battery was made and the external-short-circuit test was conducted as follows.

A positive electrode was formed by forming a positive electrode active material layer that contains a positive electrode active material composed of a lithium-nickel-cobalt-manganese compound oxide on both surfaces of a positive electrode substrate made of aluminum foil. A negative electrode was formed by forming a negative electrode active material layer that contains a negative electrode active material composed of graphite on both surfaces of a negative electrode substrate made of copper foil. The positive electrode and the negative electrode were wound together with a separator formed of three layers of polypropylene, polyethylene, and polypropylene interposed therebetween to make an electrode assembly. The electrode assembly was housed in a casing together with a non-aqueous electrolyte made by dissolving an electrolyte salt composed of $LiPF_6$ in a non-aqueous solvent to make a prismatic secondary battery as illustrated in FIGS. 1A and 1B. The capacity of the made secondary battery was set to 8.0 Ah. Here, the positive electrode current collector 20 was made of aluminum and had a thickness of 1.4 mm, and the base portion 21 was laser-welded to the leading end portion 15c of the positive terminal 15 in the vicinity of the aperture 21a, as illustrated in FIG. 5. The cutouts 23a and 23b were formed on the boundary between the base portion 21 and the lead portion 22, and the fusible portion 24 was formed in the portion indicated by the dashed line that connects the vertex A of the cutout 23a with the vertex B of the cutout 23b. The fusible portion 24 was formed so as to have the smallest cross section compared to the remaining portion of the lead portion 22.

Here, the depth of the cutout 23b was changed to make positive electrode current collectors that include the fusible portion 24 having different cross sections. As shown in Table 1, three batteries were made for each of the four types of batteries, namely, battery A to battery D, including the fusible portion 24 having different cross sections.

TABLE 1

|  | Cross Section Ratio relative to Base Portion | Heat Value Ratio relative to Base Portion | Blowout in Fusible Portion |
| --- | --- | --- | --- |
| Battery A | 94 | 0.95 | 1 out of 3 |
| Battery B | 92 | 1.10 | 3 out of 3 |
| Battery C | 90 | 1.25 | 3 out of 3 |
| Battery D | 100 | 1.00 | 0 out of 3 |

The cross sections of the fusible portion 24 in battery A to battery D were respectively set to 94%, 92%, 90%, and 100% of the cross section of a predetermined portion of the base portion 21, as shown in Table 1.

Here, it was assumed that the predetermined portion of the base portion 21 was, as illustrated in FIG. 5, a portion along line C-C that passes through an end portion of the weld-connection portions 50, for connection between the base portion 21 and the positive terminal 15, closer to the lead portion 22 in the longitudinal direction of the sealing plate 12 and that the cross section of the portion was the cross section, of the base portion 21, orthogonal to the longitudinal direction of the sealing plate 12.

Battery A to battery D that were made were brought in a fully charged state, were externally short-circuited with a resistance of about 2.0 mΩ, and were discharged until the voltage becomes 0 V. Thereafter, battery A to battery D were disassembled, and the occurrence of blowout in the fusible portion 24 was checked.

As shown in Table 1, regarding battery A, the fusible portion 24 of only one of the three batteries was blown. Regarding battery D, the fusible portion 24 of none of the three batteries was blown. In contrast, regarding battery B and battery C, the fusible portion 24 of all of the three batteries was blown. Consequently, when the cross section of the fusible portion 24 is equal to or smaller than 92% of the cross section of the predetermined portion of the base portion 21, it is possible to allow the lead portion 22 to be blown in the fusible portion 24 with certainty when an excessive current flows through the secondary battery.

Regarding battery A, although the cross section of the fusible portion 24 is 94% of the cross section of the predetermined portion of the base portion 21 and is small, the fusible portion 24 was not blown with certainty because of the following reason. The electrode assembly 13 has a thermal capacity larger than that of the lead portion 22, and therefore, part of Joule heat generated in the fusible portion 24 is conducted to the electrode assembly 13 via the lead portion 22. Accordingly, it is supposed that an increase in the temperature of the fusible portion 24 was suppressed, and the fusible portion 24 in which the largest Joule heat was generated was not necessarily blown.

In order to verify this supposition, the heat value of heat generated in the fusible portion 24 during the external-short-circuit test was measured for battery A to battery D. The result of measurement is shown in Table 1. In Table 1, the heat value of heat generated in the fusible portion 24 when the heat value of heat generated in the predetermined portion of the base portion 21 is set to 1.00 is shown. Here, the heat value was calculated by performing simulation as follows.

A cell model for analysis was formed, and an analysis was performed by using ANSYS (version 16.0 from ANSYS, Inc.). The specific heat, specific resistance, and thermal conductivity of each component were set, a current having a predetermined current value was provided from the terminal strip, and the temperature distribution was compared. The cross section of the fusible portion 24 was changed, and the relationship between the cross section and the heat value was obtained.

As shown in Table 1, regarding battery A, the heat value of heat generated in the fusible portion 24 is 0.95 relative to the heat value of heat generated in the predetermined portion of the base portion 21 and is small. Accordingly, it is considered that, although the cross section of the fusible portion 24 is 94% of the cross section of the predetermined portion of the base portion 21 and is small, the fusible portion 24 was not blown with certainty.

In contrast, regarding battery B, the heat value of heat generated in the fusible portion 24 is 1.10 relative to the heat value of heat generated in the predetermined portion of the base portion 21. Regarding battery C, the heat value of heat generated in the fusible portion 24 is 1.25 relative to the heat value of heat generated in the predetermined portion of the base portion 21. Accordingly, it is considered that an increase in the temperature of the fusible portion 24 became large, and the fusible portion 24 was blown with certainty.

Figure 6:
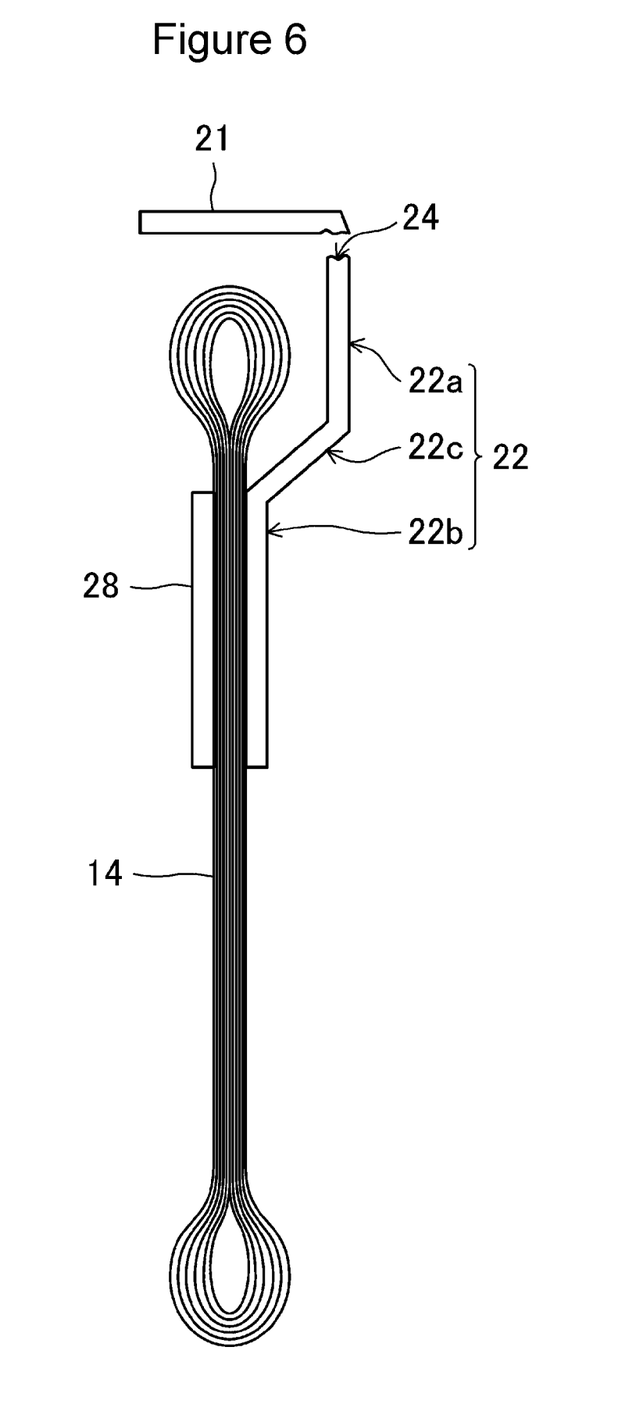
FIG. 6 is a view of the positive electrode current collector welded to the positive electrode substrate exposure portion as illustrated in FIG. 3 in which a fusible portion is blown by an excessive current.

According to the present embodiment, when the cross section of the fusible portion 24 is equal to or smaller than 92% of the cross section of the predetermined portion of the base portion 21, it is possible to allow the lead portion 22 to be blown in the fusible portion 24 with certainty when an excessive current flows through the secondary battery, as illustrated in FIG. 6. Accordingly, it is possible to prevent the lead portion 22 from coming into contact with the positive electrode substrate exposure portion 14 in the blowout location, and the connection state of the current path within the secondary battery is unlikely to become unstable. Further, it is possible to prevent a spark from being produced between the lead portion 22 and the positive electrode substrate exposure portion 14 in the blowout location, and the battery case and so on are unlikely to be damaged or broken. As a result, it is possible to realize a prismatic secondary battery that is highly reliable even in a case where an excessive current flows through the secondary battery.

In the present embodiment, the fusible portion 24 is provided on the boundary between the base portion 21 and the lead portion 22; however, the fusible portion 24 need not be provided as described above and may be provided in a portion, of the lead portion 22, closer to the sealing plate 12 than an end portion, of the electrode assembly 13, closer to the sealing plate 12. In this case, when an excessive current flows through the secondary battery, it is possible to allow the lead portion 22 to be blown in a portion apart from the electrode assembly 13 with certainty. For example, in the first area 22a of the lead portion 22, the fusible portion can be provided in an area that is located closer to the bottom of the casing 11 than the boundary between the base portion 21 and the lead portion 22 and is located closer to the sealing plate 12 than the end portion, of the electrode assembly 13, closer to the sealing plate 12. Further, in the present embodiment, the fusible portion 24 is provided in the lead portion 22 of the positive electrode current collector 20; however, the fusible portion may be provided in the lead portion 32 of the negative electrode current collector 30.

Further, in the present embodiment, the lower limit of the cross section of the fusible portion 24 is not specified; however, if the cross section is extremely small, the strength of the fusible portion 24 decreases, and the fusible portion 24 may be broken when a vibration or the like is given. Therefore, the cross section of the fusible portion 24 is preferably 50% or more of the cross section of the predetermined portion of the base portion 21 and more preferably 80% or more. Further, the thickness of the positive electrode current collector 20 is preferably within a range from 1 mm to 2 mm.

First Modification

In the above-described embodiment, the base portion 21 of the positive electrode current collector 20 is welded to the positive terminal 15 in the vicinity of the aperture 21a provided in the base portion 21, as illustrated in FIG. 4. Specifically, the cylindrical portion 15b of the positive terminal 15 is inserted into and passes through the aperture 21a provided in the base portion 21, the diameter of the leading end portion 15c is increased, and the leading end portion 15c of the positive terminal 15 is welded to the base portion 21 in the location indicated by the arrows P in FIG. 4.

However, the manner in which the base portion 21 of the positive electrode current collector 20 is welded to the positive terminal 15 is not specifically limited in the present invention, and various manners can be used.

Figure 7:
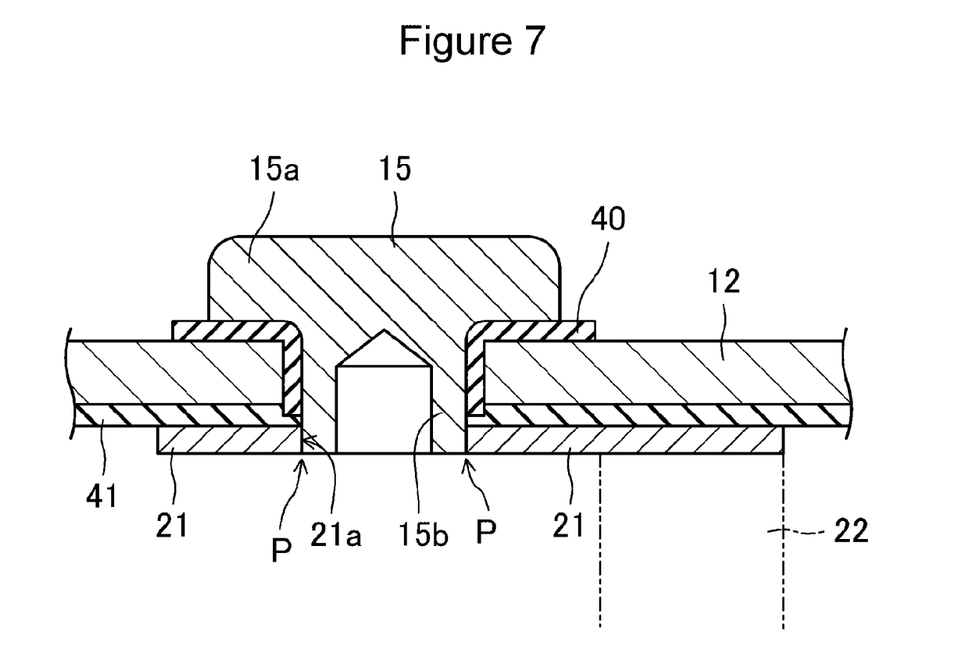
FIG. 7 is a cross-sectional view schematically illustrating the base portion of the positive electrode current collector welded to the positive terminal in a manner according to a modification of the present invention.

FIG. 7 is a cross-sectional view schematically illustrating the base portion 21 of the positive electrode current collector 20 welded to the positive terminal 15 in another exemplary manner.

As illustrated in FIG. 7, the flange portion 15a of the positive terminal 15 is located on the sealing plate 12 with the insulation member 40 interposed therebetween. The cylindrical portion 15b of the positive terminal 15 fits in the through-hole formed in the sealing plate 12 and the aperture 21a formed in the base portion 21 of the positive electrode current collector 20. The end portion of the cylindrical portion 15b of the positive terminal 15 is welded to the circumference portion of the aperture 21a of the base portion 21 in a location indicated by the arrows P in FIG. 7.

Second Modification

In the above-described embodiment, the lead portion 22 of the positive electrode current collector 20 is welded to the positive electrode substrate exposure portion 14 on one side of the positive electrode substrate exposure portion 14, as illustrated in FIG. 3. Therefore, in the positive electrode current collector 20 that is not bent, the lead portion 22 that extends from one side portion of the base portion 21 in one direction is formed, as illustrated in FIG. 2A.

In the present invention, however, welding of the lead portion 22 of the positive electrode current collector 20 to the positive electrode substrate exposure portion 14 is not limited to the above-described welding, and the lead portion 22 of the positive electrode current collector 20 may be welded to the positive electrode substrate exposure portion 14 on both sides of the positive electrode substrate exposure portion 14.

Figure 8:
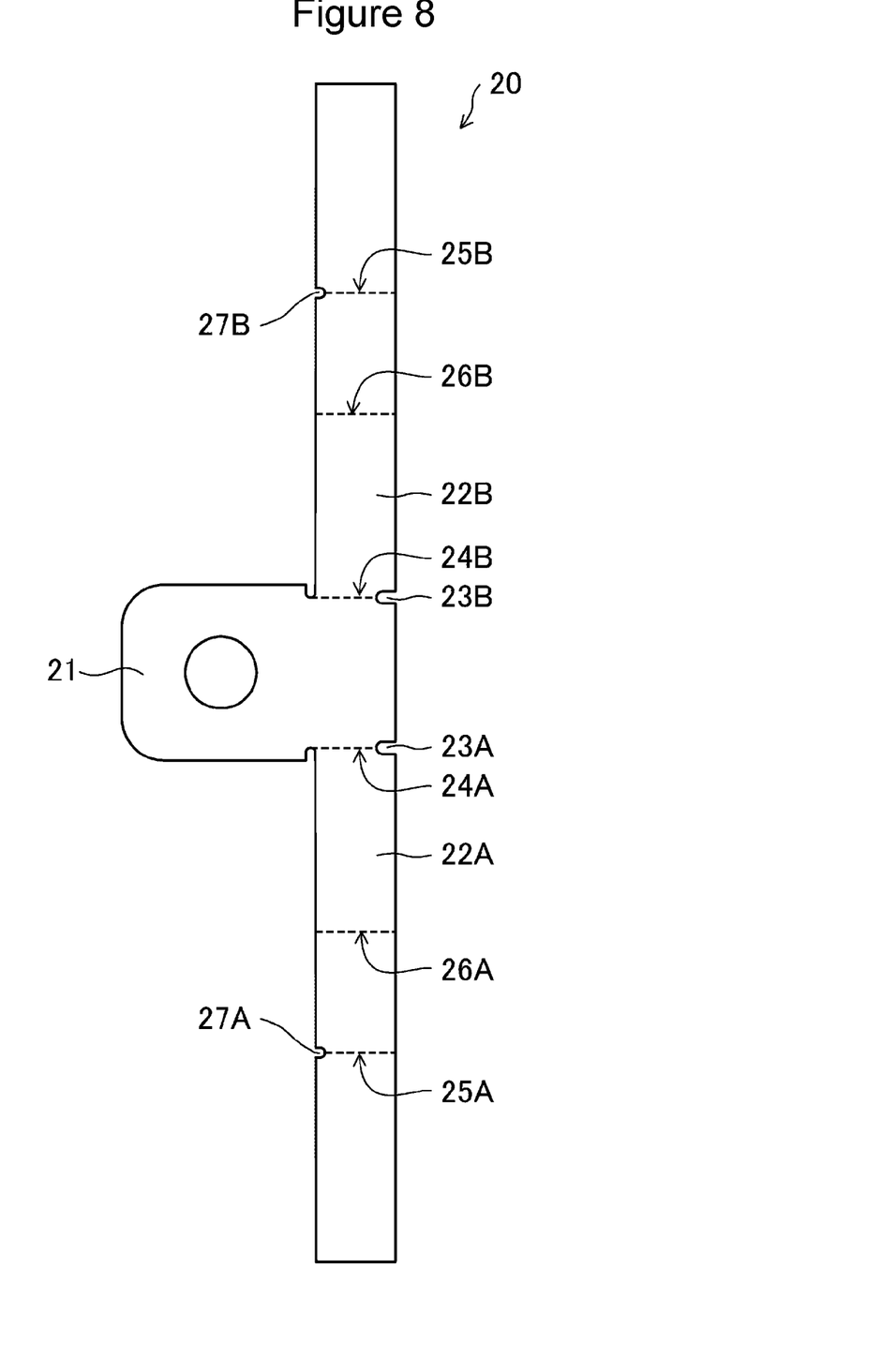
FIG. 8 is a plan view schematically illustrating the structure of the positive electrode current collector according to a modification of the present invention.

FIG. 8 is a plan view schematically illustrating the structure of the positive electrode current collector 20 that is used in a case where the lead portion 22 of the positive electrode current collector 20 is welded to both sides of the positive electrode substrate exposure portion 14.

As illustrated in FIG. 8, the positive electrode current collector 20 includes the base portion 21 and lead portions 22A and 22B, which respectively extend in directions opposite to each other from the respective sides of the base portion 21. A cutout 23A is formed on the boundary between the base portion 21 and the lead portion 22A to form a fusible portion 24A, which is fusible by an excessive current. Similarly, a cutout 23B is formed on the boundary between the base portion 21 and the lead portion 22B to form a fusible portion 24B, which is fusible by an excessive current. The lead portion 22A is bent along the dashed lines 25A and 26A, and the lead portion 22B is bent along the dashed lines 25B and 26B, as illustrated in FIG. 3.

Here, the fusible portion 24A has the smallest cross section compared to the remaining portion of the lead portion 22A, and the fusible portion 24B has the smallest cross section compared to the remaining portion of the lead portion 22B. The cross sections of the fusible portions 24A and 24B are equal to or smaller than 92% of the cross section, of the base portion 21, that passes through an end portion of the weld-connection portions, for connection between the base portion 21 and the positive terminal 15, closer to the lead portions 22A and 22B in the longitudinal direction of the sealing plate 12 and that is orthogonal to the longitudinal direction of the sealing plate 12.

With such a structure, when an excessive current flows through the secondary battery, it is possible to allow the lead portion 22A to be blown in the fusible portion 24A provided on the boundary between the base portion 21 and the lead portion 22A and to allow the lead portion 22B to be blown in the fusible portion 24B provided on the boundary between the base portion 21 and the lead portion 22B with certainty.

It is preferable that one lead portion be provided for the base portion 21 as in the above-described embodiment. If one lead portion is provided for the base portion 21 as in the above-described embodiment, it is possible to allow the current collector to be blown when an excessive current flows through the secondary battery with more certainty than in the case where two lead portions are provided for the base portion 21. Therefore, if one lead portion is provided for the base portion 21 as in the above-described embodiment, the secondary battery becomes more reliable.

Third Modification

In the above-described embodiment, the positive terminal 15 passes through the through-hole provided in the sealing plate 12 and fixed to the sealing plate 12, as illustrated in FIGS. 1A and 1B.

However, the positive terminal 15 having such a structure need not be provided in the present invention, and the sealing plate 12 may also serve as the positive terminal.

Figure 9:
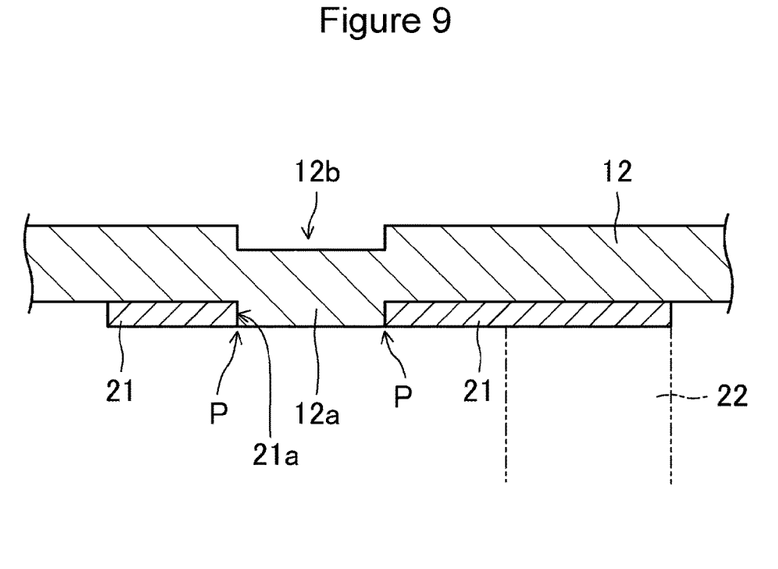
FIG. 9 is a cross-sectional view schematically illustrating the base portion of the positive electrode current collector welded to the positive terminal (sealing plate) in a manner according to a modification of the present invention.

FIG. 9 is a cross-sectional view schematically illustrating the base portion 21 of the positive electrode current collector 20 welded to the positive terminal (sealing plate 12) in the case where the sealing plate 12 also serves as the positive terminal.

As illustrated in FIG. 9, the sealing plate 12 has a projection 12a inside the battery, and the projection 12a is located in the aperture 21a formed in the base portion 21. The end portion of the projection 12a of the sealing plate 12 is welded to the circumference portion of the aperture 21a of the base portion 21 in a location indicated by the arrows P in FIG. 9. Here, the projection 12a can be formed by, for example, pressing the sealing plate 12. In this case, an indentation 12b is formed on a side opposite to the projection 12a.

In this modification, the negative terminal 17 passes through the through-hole provided in the sealing plate 12 and is fixed to the sealing plate 12, as illustrated in FIGS. 1A and 1B. The structure of the positive electrode current collector 20 and the manner in which the lead portion 22 of the positive electrode current collector 20 is welded to the positive electrode substrate exposure portion 14 are the same as those described in the above-described embodiment.

Embodiments of the present invention have been described above; however, the description is not restrictive, and various modifications can be made as a matter of course. For example, in the above-described embodiment, the fusible portion 24 is provided by forming the cutouts 23a and 23b on the respective end portions of the lead portion 22 in the width direction; however, the fusible portion 24 is not limited to this. For example, the fusible portion 24 may be provided by forming a groove that extends in the width direction of the lead portion 22 and has a decreased thickness.

In the above-described embodiment, the description is given under the assumption that the secondary battery 10 is a non-aqueous electrolyte secondary battery, for example; however, the type of secondary battery need not be specifically limited, and the present invention is applicable to lithium-ion secondary batteries and nickel-hydrogen secondary batteries, for example. Further, the present invention is more preferably applicable to prismatic secondary batteries having a capacity of 5 Ah or more. The present invention is specifically effective when applied to lithium-ion secondary batteries having a capacity of 5 Ah to 15 Ah. For lithium-ion secondary batteries, publicly known materials can be used. For example, as the positive electrode active material, it is preferable to use a lithium transition metal compound oxide. As the negative electrode active material, it is preferable to use a carbon material or a silicon material.

Others

A prismatic secondary battery according to another aspect of the present invention includes: a casing that has an opening; an electrode assembly that is housed in the casing and includes a positive electrode and a negative electrode; a sealing plate that seals the opening; a terminal that is electrically connected to the positive electrode or to the negative electrode and passes through a through-hole provided in the sealing plate; and a current collector that is electrically connected to the positive electrode or to the negative electrode. The current collector has a base portion that is located between the sealing plate and the electrode assembly along the sealing plate, and a lead portion that extends from an end portion of the base portion in a direction toward a bottom of the casing. The base portion is connected to the terminal in the base portion. The lead portion is connected to a substrate exposure portion of the positive electrode or the negative electrode. On a boundary between the base portion and the lead portion, a first cutout is formed on one end portion of the lead portion in a width direction of the lead portion, and a second cutout is formed on the other end portion thereof. A straight line that connects a vertex A of the first cutout with a vertex B of the second cutout is substantially parallel to a straight line that extends in a longitudinal direction of the sealing plate.

If such a structure is employed, in a case of forming the current collector by bending a plate-like metal material, the current collector can be formed in a predetermined form with more certainty. Therefore, it is possible to weld-connect the current collector to the substrate exposure portion at a predetermined position under a predetermined condition, which results in a more reliable secondary battery. The structure is specifically effective in a case of bending the current collector having the base portion fixed to the sealing plate.

The slope of the straight line that connects the vertex A with the vertex B relative to the straight line that extends in the longitudinal direction of the sealing plate is preferably within a range from $-10°$ to $10°$ and more preferably within a range from $-5°$ to $5°$.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A prismatic secondary battery comprising:
   a casing that has an opening;
   an electrode assembly that is housed in the casing and includes
   a positive electrode, and
   a negative electrode;
   a sealing plate that seals the opening and has a through-hole;
   a terminal that is electrically connected to the positive electrode or to the negative electrode and passes through the through-hole; and
   a current collector that is electrically connected to the positive electrode or to the negative electrode and has
   a base portion that is located between the sealing plate and the electrode assembly along the sealing plate, has an aperture, and is weld-connected to the terminal in a vicinity of the aperture, and
   a lead portion that extends from an end portion of the base portion in a direction toward a bottom of the casing, is connected to a substrate exposure portion of the positive electrode or the negative electrode, and has a fusible portion that is fusible by an excessive current, the fusible portion being located closer to the sealing plate than an end portion, of the electrode assembly, closer to the sealing plate and having a smallest cross section compared to a remaining portion of the lead portion, wherein the fusible portion has a cross section that is equal to or smaller than 92% of a cross section of the base portion that passes through an end portion of a weld-connection portion, for connection between the base portion and the terminal, closer to the lead portion in a longitudinal direction of the sealing plate and that is orthogonal to the longitudinal direction of the sealing plate.

2. The prismatic secondary battery according to claim 1, wherein the fusible portion is provided on a boundary between the base portion and the lead portion.

3. The prismatic secondary battery according to claim 1, wherein the fusible portion has a first cutout in an end portion of the lead portion in a width direction of the lead portion.

4. The prismatic secondary battery according to claim 1, wherein the fusible portion has a cross section that is equal to or larger than 50% of the cross section of the base portion that passes through the end portion of the weld-connection portion, for connection between the base portion and the terminal, closer to the lead portion in the longitudinal direction of the sealing plate and that is orthogonal to the longitudinal direction of the sealing plate.

5. The prismatic secondary battery according to claim 1, wherein the electrode assembly is a wound electrode assembly in which the positive electrode and the negative electrode are wound together, the wound electrode assembly is housed in the casing such that a winding axis is oriented parallel to the sealing plate, the lead portion has a first area that extends from the base portion toward the bottom of the casing, a second area that is located closer to a center of the casing than the first area and is connected to the substrate exposure portion, and a third area that connects the first area with the second area, on a boundary between the second area and the third area, a second cutout is provided, and in the lead portion, a portion in which the second cutout is provided has a cross section that is larger than the cross section of the fusible portion.

6. The prismatic secondary battery according to claim 1, wherein the prismatic secondary battery has a capacity of 5 Ah or more.

7. The prismatic secondary battery according to claim 1, wherein the current collector is made of aluminum or an aluminum alloy and has a thickness that is within a range from 1 mm to 2 mm.

8. A prismatic secondary battery comprising:

a casing that has an opening;

an electrode assembly that is housed in the casing and includes a positive electrode, and a negative electrode;

a sealing plate that seals the opening and has a projection inside the prismatic secondary battery; and a current collector that is connected to the positive electrode or to the negative electrode, is connected to the sealing plate, and has a base portion that is located between the sealing plate and the electrode assembly along the sealing plate, has an aperture, and is weld-connected to the projection located in the aperture, and a lead portion that extends from an end portion of the base portion in a direction toward a bottom of the casing, is connected to a substrate exposure portion of the positive electrode or the negative electrode, and has a fusible portion that is fusible by an excessive current, the fusible portion being located closer to the sealing plate than an end portion, of the electrode assembly, closer to the sealing plate and having a smallest cross section compared to a remaining portion of the lead portion, wherein the fusible portion has a cross section that is equal to or smaller than 92% of a cross section of the base portion that passes through an end portion of a weld-connection portion, for connection between the base portion and the projection, closer to the lead portion in a longitudinal direction of the sealing plate and that is orthogonal to the longitudinal direction of the sealing plate.

9. The prismatic secondary battery according to claim 8, wherein the electrode assembly is a wound electrode assembly in which the positive electrode and the negative electrode are wound together, the wound electrode assembly is housed in the casing such that a winding axis is oriented parallel to the sealing plate, the lead portion has a first area that extends from the base portion toward the bottom of the casing, a second area that is located closer to a center of the casing than the first area and is connected to the substrate exposure portion, and a third area that connects the first area with the second area, on a boundary between the second area and the third area, a second cutout is provided, and in the lead portion, a portion in which the second cutout is provided has a cross section that is larger than the cross section of the fusible portion.

\* \* \* \* \*